Feb. 12, 1952     L. W. PETERSEN     2,585,831
DEGASIFICATION OF LIQUIDS
Filed Nov. 23, 1946
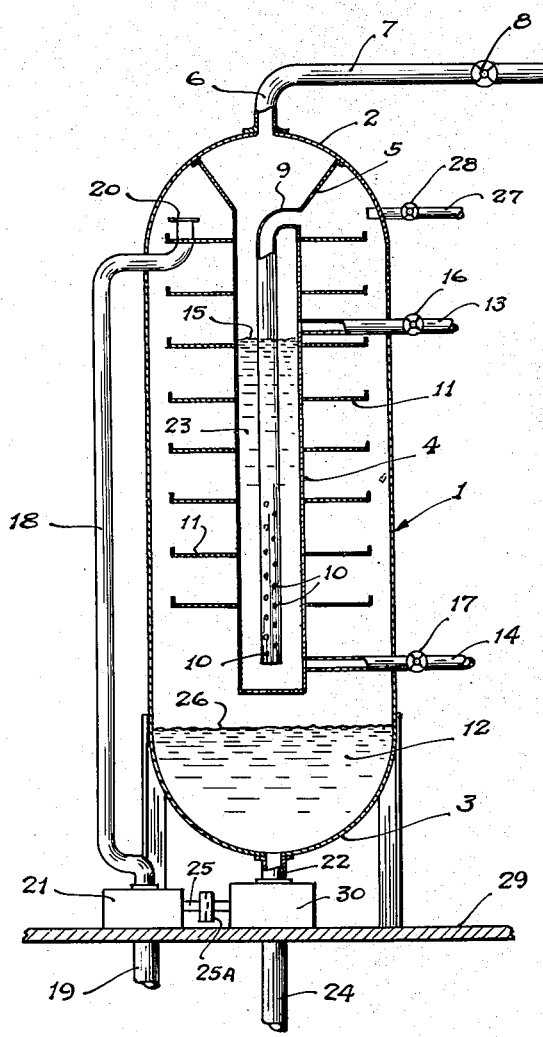
INVENTOR.
*Lowell W. Petersen*
BY *R. G. Story*
ATTORNEY Patented Feb. 12, 1952

2,585,831

UNITED STATES PATENT OFFICE 2,585,831

DEGASIFICATION OF LIQUIDS

Lowell W. Petersen, Chicago, Ill., assignor to Swift & Company, Chicago, Ill., a corporation of Illinois Application November 23, 1946, Serial No. 711,924

7 Claims. (Cl. 183—2.5)

My invention relates to a simple yet effective apparatus and method for the removal of undesirable gaseous constituents from liquids, whether such constituents are in solution or in mechanical admixture with said liquids, by utilizing low pressures in conjunction with adsorptive or absorptive materials. An illustration of the use of my invention is the removal of sulphureous fumes from water, such deleterious gaseous constituents commonly being present in water, and often undesirable from either a human consumption or industrial usage standpoint. Other deleterious gases in solution appearing in fluids may also be removed by the use of the apparatus herein disclosed.

The retention of gases in liquid solution is dependent on both temperature and pressure. Subjecting fine particles of a gas containing liquid to reduced pressure has the effect of removing the entrained gases from solution. The present invention employs this reduced pressure principle while providing for neutralization and subsequent removal from the apparatus of the undesirable gases.

Heretofore degasification processes relating to a vacuum removal method or apparatus such as is herein disclosed have encountered the difficulty of maintenance of vacuum equipment which comes into contact with the removed and often corrosive and destructive gases. Corrosion difficulties are obviated by my invention for the removed gases are passed into solution in an appropriate solvent having adsorbent or absorbent properties and removed from the apparatus without coming into contact with the vacuum inducing means. The vacuum equipment required by the present invention is smaller because of the physical and/or chemical reaction occurring between the evacuated gas and the liquid, slurry, semi-solid, or granular solid solvent.

An object of the invention is to provide an apparatus and a process for utilizing reduced pressures in conjunction with absorptive or adsorptive reactions to remove undesirable or deleterious gases from liquids, whether such gases be in solution or in admixture with said liquids.

Another object of the invention is to provide an apparatus for the removal of gaseous constituents of liquids wherein the admission to the apparatus of charging stock or liquids which it is desired to subject to degasification, and the discharging of purified or degasified liquid from the apparatus, are automatically regulated and controlled, so that input of charging stock and output of degasified liquid are equal in volume, the storage level of degasified liquid thereby being maintained at a proper and predetermined height.

A further object is to provide an apparatus which utilizes the aforesaid reduced pressures and the liquid pressure of the charging stock to operate the degasified liquid discharging pump.

A still further object of the invention is to provide apparatus for subjecting liquid to a reduced pressure while it is broken up into fine particles, then drawing off the released gases and, by passing them through a solvent which is also under reduced pressure, enabling ready removal of the liberated gases from the degasification equipment and the use of smaller vacuum inducing equipment.

For a better understanding of the invention, its advantages and the objects hereinbefore mentioned, reference is made to the accompanying drawing in which is diagrammatically illustrated a preferred embodiment.

The drawing illustrates in sectional view a degasification tank or treating chamber 1 which is provided with two convex end closures at the top and bottom, 2 and 3 respectively. The top portion 2 of the tank provides support for an inner vacuum tank 4. The latter preferably has its upper end flared outwardly as indicated at 5, the flared end being affixed in any suitable manner, as by welding, to the convex top 2. The vacuum tank 4 is also provided with an outlet 6, to the vacuum creating apparatus, not shown, which may be any moderately high vacuum inducing means, such as a water jet, steam jet or a wet or dry vacuum pump. An appropriate suction line to this mechanism is shown at 7, said pipe preferably being provided with any suitable type of stop valve 8.

It will be seen that the vacuum tank 4 has only one interconnecting means to the outer tank, or treating chamber 1. This consists of the released gas discharge pipe 9 leading from the top portion of the outer tank to the bottom portion of the vacuum tank. The lower part of pipe 9 is provided with numerous perforations or orifices indicated at 10 which are used as a means of access for escape of the removed gases into and through a solvent 23.

Externally of the tank 4 and at spaced intervals surrounding its periphery are a suitable number of tray or baffles 11, there being eight indicated in the drawing. These trays are each provided with liquid dispersing media or splash surfaces such as coke or charcoal or any other similar type of packing material which is insoluble in water, but which when placed upon the trays presents a jagged and uneven contour adapted to break up and scatter the descending liquid into minute particles or droplets. The trays are also provided with a number of perforations or orifices to permit descent of the charging liquid from tray to tray and finally to the degasified liquid storage chamber 12. The bottom tray of the series is located in tank 1 slightly above the storage liquid level and at a height appreciably above the convex portion 3 of tank 1 so as to provide sufficient space for the degasified liquid.

The solvent used in vacuum tank 4 is admitted through a filling pipe 13 and discharged through pipe 14, the liquid level of the solvent normally being as shown at 15, or just below the filling line. Both of these inlet and outlet means are provided with suitable valve controls 16 and 17, respectively.

The solvents which may be used in the gas solvent contact chamber 4 may be any inorganic or organic liquid, slurry, semi-solid, or granular solid material that will readily adsorb or absorb the gas to be removed by a physical or chemical reaction. For example, sodium or potassium hydroxide will remove $CO_2$ and $H_2S$ as well as $SO_2$, $SO_3$ and $Cl_2$. Cuprous ammonium chloride or alkaline potassium pyrogallol will remove $O_2$. Poly phenolic compounds, poly unsaturated acids, phenolic amines and anti-oxidants will remove $O_2$ by combining therewith. Thio-sulfates and sulfites will also remove $O_2$. Calcium hydroxide and water soluble iron salts will react with and remove $H_2S$. Many other inorganic and organic liquids, slurries, semi-solids, and granular solids will react with gases and these materials are intended to be included under the term solvent.

Fresh liquid to be degasified is admitted to the tank 1 by means of pipe 18. The liquid enters the degasification chamber under pressure through the inlet pipe 19, the pressure, applied from an external source, being sufficient, when aided by the partial vacuum in treating tank 1, to force the liquid through pipe 18, out of the pipe end 20 and into the degasification chamber.

In its course from 19 to 20 the charging liquid is forced to pass through a rotary positive displacement liquid motor 21, the pressure head of liquid charged through 19 aided by the partial vacuum in the treating tank 1, being sufficient to operate motor 21 as required.

Discharging of the degasified liquid is provided for by a conduit 22 in the lower convex portion 3 or storage chamber, of the tank. Such conduit may lead to any suitable atmospheric storage tank. As the induced vacuum in the outer degasifying tray chamber may be of considerable proportion, a positive pump discharge of liquid from the reservoir 12 is provided, as gravity flow therefrom may not ordinarily be sufficient. My invention is further designed to provide for positive expulsion of degasified liquid in a definite flow equal to the amounts admitted to the apparatus, in the following manner:

Pipe 22 conducts the degasified liquid through a rotary positive displacement liquid pump 30 and out through discharge pipe 24 to suitable storage. In order that advantage of the pressure head in line 18 induced by both positive pump pressure and partial vacuum, may be fully utilized to perform the discharge operation, motor 21 and pump 30 are positively interconnected by a drive shaft 25 wherein may be placed any form of suitable universal coupling 25A. Fluid motor 21 and pump 30 have the same positive displacement. Accordingly, fluid forced into the apparatus through line 18 will be equal in amount to the amount of degasified liquid discharged from the degasified storage chamber 12.

In order that the desired vacuum may be further controlled in the tray portion of the degasifying tank, an air inlet pipe 27 is provided at any part of the upper portion thereof, the said pipe having a suitable valve control 28. The air inlet may also be used to vent or flush the system after operation. The air inlet may also be used to add another gas, such as air or oxygen, which will react with the gas being removed from the liquid being treated, forming a new material resulting in the removal of both the added gas and the undesirable gas contained in the liquid being treated.

The entire structure is supported in any suitable manner upon a base 29.

As hereinbefore stated, the liquid level of the solvent fluid in the vacuum tank is kept at the point 15 indicated in the drawing in order that a considerable portion of the gas discharge pipe 9 will be immersed in the solvent. Similarly the apparatus is generally regulated so that the degasified liquid will be kept at a level approximately indicated at 26, and at an appreciable distance below the vacuum tank.

From the foregoing description of the apparatus herein illustrated the operation of applicant's invention will be apparent. It will be seen that the contaminated liquid which it is desired to degasify will be forced into the upper tray portion of the tank through line 18. Each of the aforesaid trays are perforated and as the liquid empties on to the topmost tray it impinges upon the splash surfaces comprising coke, charcoal or other material situated thereon. Thus the liquid will be dispersed into relatively small particles which will descend through the perforations to the tray below. This dispersion of the liquid will increase manyfold as it splashes from tray to tray, each time being subjected to the scattering action of the splash material. By this means also the liquid is quickly and efficiently spread over the entire cross-sectional area of the treating tank 1.

It will be apparent that the vacuum induced in tank 4 will have the effect of also producing a partial but moderately high vacuum in the outer treating chamber 1. As pressure in the vacuum chamber 4 is reduced, the liquid level in pipe 9 will be lowered until orifices 10 are in contact with the released gases present in the outer treating chamber 1. As the liquid level in pipe 9 is lowered, the liquid lever 15 in tank 4 rises. As soon as the gases contained in chamber 1 contact orifices 10 through pipe 9, the gases will pass into treating solution 23 in which reactions will occur removing active constituents therefrom. A sufficient difference in pressure conditions within chamber 4 compared to chamber 1 will draw the gases from it through line 9 to and through line 6.

Throughout its course from top to bottom tray the liquid is therefore subjected to a reduced pressure induced by flow of gases out discharge line 9. Such reduced pressure when applied to the thin films and droplets of finely dispersed liquid, effectually removes the substantial portion of all gases, in solution or otherwise, in the liquid.

When the liquid reaches the bottom or reservoir portion of the treating chamber, nearly all of the dissolved and mechanically admixtured gases will be stripped therefrom. As these may be of a deleterious nature, sufficient in strength to contaminate the vacuum inducing means and associated apparatus, they are then passed through line 9 by reason of the said vacuum, making their exit through the aforesaid perforations 10. The gases will then have to pass through a substantial portion of the solvent liquid, and will pass into admixture or solution therewith. The latter is preferably a solution having adsorbent or absorbent qualities and may, of course, vary in composition in accordance with the nature of the gases to be removed. Such gases as are removed in the tray chamber of treating tank 1 will readily go into solution with a liquid solvent for which, by nature of the aforementioned qualities, they have a ready affinity. Certain gases, such as oxygen, hydrogen sulphide and carbon dioxide, have relatively high reactive characteristics. These particularly will be dissolved with great ease in the foregoing manner. When the solvent in the vacuum tank has reached its capacity and becomes so contaminated with the liberated gases as to be useless, it may be removed and the vacuum tank refilled with a fresh solvent by the pipes 13 and 14 hereinbefore described, or a continuous circulation of solvent liquid therethrough may be maintained. In this manner the deleterious gases are eliminated without any possibility of corrosive action on the described apparatus or vacuum inducing means, and in addition, smaller vacuum inducing apparatus can be used.

The liquid pressure head of the charging stock as it enters the intake line 19 together with the vacuum in tank 1 is utilized to its fullest extent by my invention by causing it to operate motor 21 which in turn will operate and maintain control over pump 30. The use of the vacuum and pump pressure in this way greatly minimizes the energy which would ordinarily be necessary to pump the reservoir free of degasified liquid. In this manner also it is possible to at all times maintain a standard height of liquid in the reservoir without fear of fouling the upper portions of the apparatus, such as the coke containing trays, with the degasified liquid.

The following is given as illustrative and as an example of the operation of my invention in the reduction of the hydrogen sulphide content of a liquid at a temperature of 15° centigrade and a pressure of 1 atmosphere. With a starting liquid containing 4411 parts per million of soluble $H_2S$ the vapor space above the liquid contained proportionate parts of the vaporized liquid and $H_2S$. This liquid run through the described apparatus in accordance with the method of my invention in which the pressure in the vacuum chamber is maintained at 25.4 mm. Hg absolute pressure or approximately 0.033 atmosphere removed all but 74.2 parts per million of $H_2S$ from the liquid. The remaining $H_2S$ has been calculated and is based upon its vapor pressure at 12.613 mm. mercury and the mol fraction of $H_2S$ remaining in the liquid. It will thus be readily appreciated that an overall reduction of 98.3% in the concentration of $H_2S$ in the liquid is effectuated.

It is contemplated that the degasified liquid may be recycled to the system for retreatment or for diluting the raw liquid and reducing the gas content of the charging material. For this purpose any portion of the liquid withdrawn through line 24 may be transferred by means not shown to the charge line 19.

Although I have shown only one unit in the drawings, it is to be understood that two or more units in series may be used whereby the liquid to be degasified is treated in a plurality of stages. In case a series of units such as the one shown in the drawing are used, it may be desirable to flow the solvent in series through the various units. One method of operation is to flow the solvent concurrent with the flow of the liquid to be degasified whereby the strongest solvent is contacted with the strongest gases and the weakest solvent with the weakest gases, thereby effectively using up the solvent. However, in some cases it may be desirable to use countercurrent flow of solvent and liquid to be degasified since more complete exhaustion of the solvent may sometimes be obtained in this manner.

The rate of flow of the liquid to be degasified may vary within wide limits and may be at a rate approaching zero to a rate at which flooding of the dispersing material occurs.

From the foregoing it will appear that I have produced a method and means for the continuous degasification of liquids which is highly efficient, practical and of simple construction.

While I have illustrated and described the preferred embodiment of my invention, it will be apparent to those skilled in the art that changes may be made in the form of apparatus and method disclosed without departing from the spirit of my invention as set forth in the appended claims.

Having now described my invention, what I claim as new and desire to secure by Letters Patent is:

1. In a degasifying apparatus, a treating chamber for treating liquids to release gases therefrom, means for introducing liquids to be degassed into said chamber and for withdrawing degassed liquids therefrom, a vacuum chamber containing an absorbent material within said treating chamber, means for contacting gases released from the liquids in said treating chamber with said absorbent in said vacuum chamber, and means for exhausting gases from said vacuum chamber.

2. In a degasifying apparatus, a treating tower for treating liquids to release gases therefrom, means for introducing liquids to be degassed into said tower and for withdrawing degassed liquids therefrom, an elongated solvent chamber within said tower, means for contacting gases from the treating tower with the solvent in said solvent chamber, means for charging solvent to and for discharging solvent from said solvent chamber, and means for exhausting gases from said solvent chamber.

3. In a degasifying apparatus, a treating tower for treating liquids to release gases therefrom, means for introducing liquids to be degassed into the upper portion of said tower and for withdrawing degassed liquids from the lower portion of said tower, a solvent tower within and spaced apart from said treating tower, baffle means in the space between said towers, means for contacting gases from the treating tower in said solvent tower, means for charging solvent to and for discharging solvent from said solvent tower, and means for exhausting gases from said solvent tower.

4. In a degasifying apparatus, a treating tower for treating liquids to release gases therefrom, means for introducing liquids to be degassed into the upper portion of said tower, means for withdrawing degassed liquids from the lower portion of said tower, means for exhausting gases from the upper portion of said tower, a solvent tower within and spaced apart from said treating tower thereby forming an annular space between said towers, a plurality of baffles in said annular space to increase the surface of the liquids and to facilitate the release of gases therefrom, a conduit between said solvent tower and said exhaust means, means for introducing solvent into the upper portion of said solvent tower, means for discharging solvent from the lower portion of said solvent tower, and means for contacting the gases released in said treating tower with the solvent in said solvent tower.

5. The method of protecting vacuum equipment from corrosive ingredients contained in the gaseous constituents of a liquid during degasification of such liquid, comprising the steps of introducing the liquid to be degassed into a zone maintained under sub-atmospheric pressure, separating gases from the liquid in said zone, contacting the separated gases with a gas absorbent material within said zone to remove undesirable ingredients from the gases, and then discharging the residual gases and the degassed liquid from the sub-atmospheric pressure zone.

6. The method of protecting vacuum equipment from corrosive ingredients contained in the gaseous constituents of a liquid during degasification of such liquid; comprising the steps of passing a stream of liquid to be degassed through a zone of sub-atmospheric pressure, separating gases from the liquid in said zone, passing a stream of an absorbent material through said sub-atmospheric pressure zone out of contact with the aforesaid liquid stream; contacting said separated gases with said absorbent material, still under sub-atmospheric pressure, to remove undesirable ingredients from said gases; and then discharging the residual gases and the degassed liquid from said sub-atmospheric pressure zone.

7. The method of protecting vacuum equipment from corrosive ingredients contained in the gaseous constituents of a liquid during a continuous degasification of such liquid, comprising the steps of passing a stream of the liquid to be degassed through a sub-atmospheric pressure zone wherein the gases are separated from the liquid; continuously contacting said separated gases in a counter-current flow, still under sub-atmospheric pressure, with a stream of an absorbent material maintained out of contact with the aforesaid liquid stream to remove undesirable ingredients from said gases, and continuously removing residual gases and degassed liquid from the aforesaid sub-atmospheric pressure zone.

LOWELL W. PETERSEN.

REFERENCES CITED

The following references are of record in the file of this patent:

UNITED STATES PATENTS

| Number | Name | Date |
|---|---|---|
| 457,917 | Shaw | Aug. 18, 1891 |
| 716,803 | Zahm et al. | Dec. 23, 1902 |
| 1,418,002 | Kothny | May 30, 1922 |
| 1,519,932 | Reich | Dec. 16, 1924 |
| 2,020,250 | Stephens et al. | Nov. 5, 1935 |
| 2,047,157 | Rodman et al. | July 7, 1936 |
| 2,136,774 | Hickman | Nov. 15, 1938 |
| 2,141,349 | Engelhardt | Dec. 27, 1938 |
| 2,455,681 | Kantor et al. | Dec. 7, 1948 |